Sept. 5, 1944.    H. P. FOCHT    2,357,465
AUTOMATIC BALANCE TAB
Filed Aug. 23, 1940    2 Sheets-Sheet 1

INVENTOR
HARRY P. FOCHT.
BY
ATTORNEY

Sept. 5, 1944.　　　H. P. FOCHT　　　2,357,465
AUTOMATIC BALANCE TAB
Filed Aug. 28, 1940　　　2 Sheets-Sheet 2
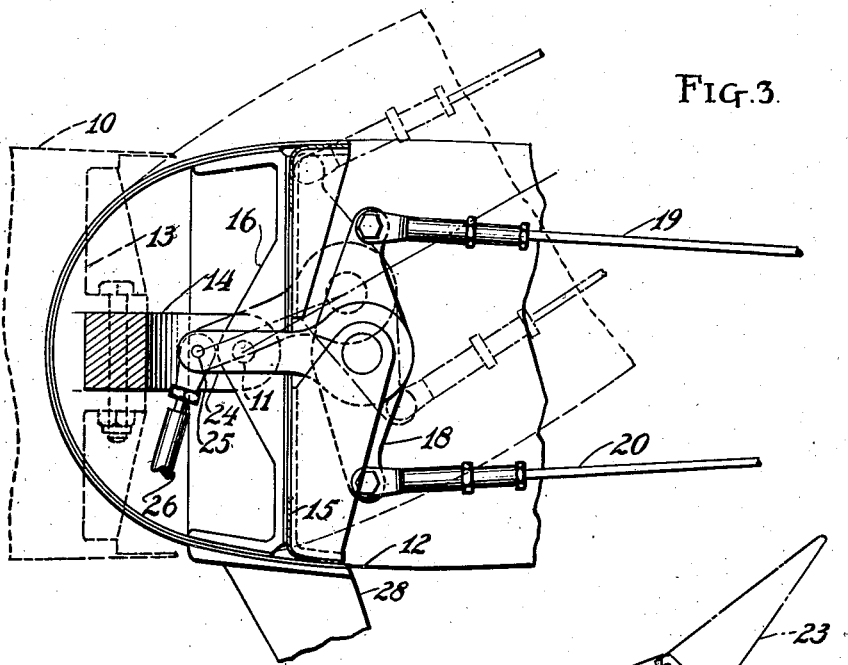
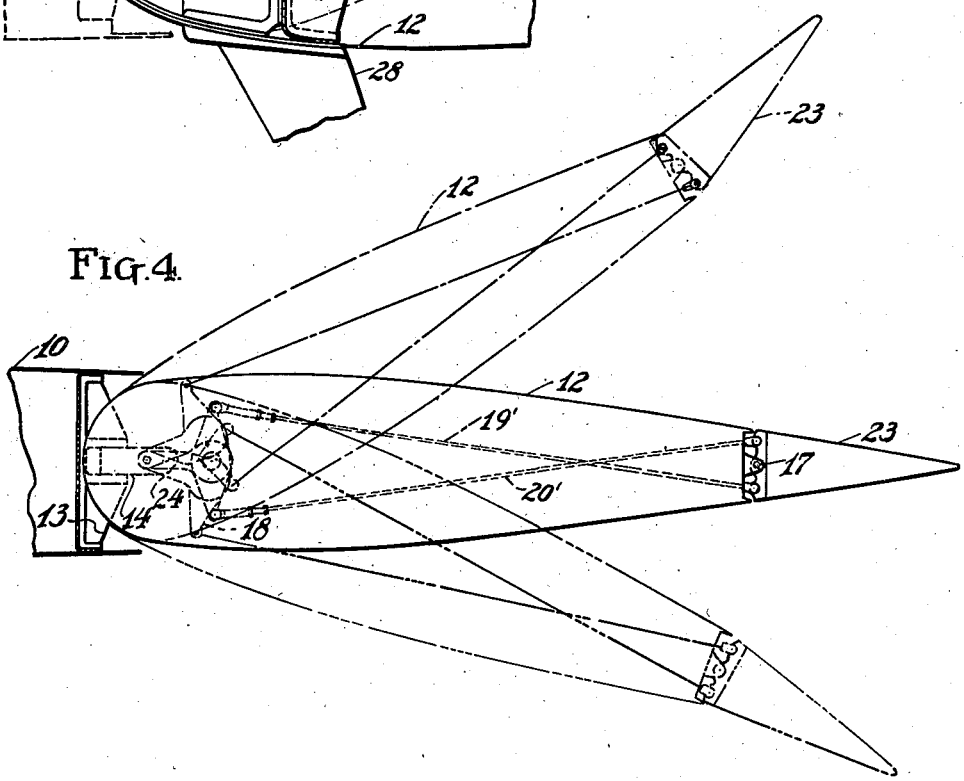
INVENTOR
HARRY P. FOCHT.
BY
ATTORNEY Patented Sept. 5, 1944

2,357,465

UNITED STATES PATENT OFFICE 2,357,465

AUTOMATIC BALANCE TAB

Harry P. Focht, Kenmore, N. Y., assignor to Curtiss-Wright Corporation, a corporation of Delaware Application August 28, 1940, Serial No. 354,540

2 Claims. (Cl. 244—82)

This invention relates to control devices for aircraft and in particular provides means for automatically differentially controlling a trailing edge tab or flap with respect to a movable control surface upon which the tab is mounted.

In the prior art there are showings of auxiliary tabs or flaps controllably disposed at the rear edges of control airfoils such as rudders, elevators, or ailerons. Such tabs may be moved with respect to the control airfoils either by setting them on the ground, or by setting them through control devices operable by an aircraft pilot. They are further arranged as servo devices to assist in the control of the airfoil but, so far as applicant is aware, none have been provided with mechanism whereby the angle of incidence of the tab may be changed in the same or opposite sense as the control airfoil as the latter is moved, and in a different angular degree from the control airfoil movement. Accordingly, it is an object of this invention to provide control mechanism for a trim tab by which the tab may be moved differentially in either the same direction or in the opposite direction from control airfoil movement.

It is a further object of this invention to provide means by which the neutral setting of the trim tab may be controllably changed while the differential movement features are still operative upon control airfoil movement.

A further object of the invention is to provide tab control means whereby the angular relationship of the tab with respect to the control airfoil on which it is mounted, changes as the control airfoil is moved.

A further object is to provide means for moving the tab to a lesser angular extent than the angular movement of the controlled airfoil, and still another object is to provide mechanism for moving a trim tab to a greater angular extent than the movement of the control airfoil on which it is mounted.

Further objects of the invention will become apparent in reading the description below in connection with the drawings, in which:

Fig. 3 is an enlarged view of a portion of Fig. 1; and

Fig. 4 is a view similar in aspect to Fig. 1 but showing an alternate arrangement of the invention.

Figure 1:
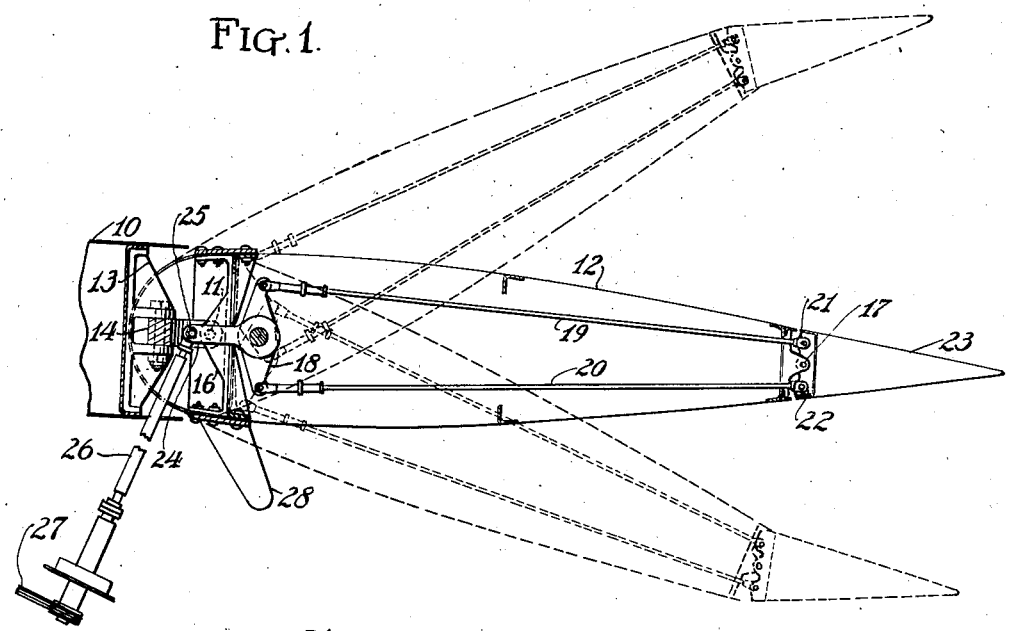
Fig. 1 is a longitudinal section on the line 1—1 of Fig. 2, a fixed airfoil, a movable control airfoil, and a trim tab serially arranged.
Figure 2:
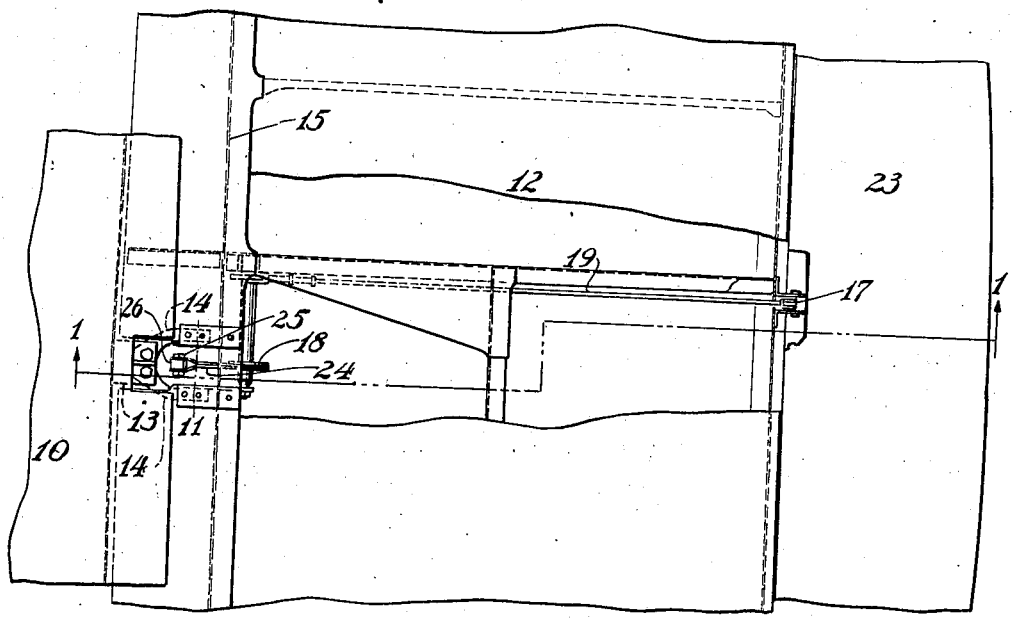
Fig. 2 is a fragmentary plan of the assembly of Fig. 1.

First referring to Figs. 1, 2, and 3, I show a member 10 which may comprise a wing, fin, or horizontal stabilizer which is fixed with respect to an aircraft. To the trailing edge of the member 10, upon a hinge pin 11, a control airfoil 12 is mounted in any convenient manner. As shown, the member 10 carries a bracket 13 provided with a yoke 14 the rear ends of which carry the hinge 11. The air foil 12 comprises a transverse beam 15 having projections 16 engaging the hinge 11. To the trailing edge of the airfoil and disposed rearwardly of the hinge 11 is a rock arm 18 the ends of which are connected by cables or control rods 19 and 20 clevised at their rearward ends, as at 21 and 22, to the tab 23 at pivot points disposed above and below the tab hinge 17. A forward extension 24 is rigid with the rock arm 18, this member having a pivot 25 disposed forward of the airfoil hinge 11, this pivot being secured to a strut 26 adjustable in length by a screw shift or the like, the strut being secured to the aircraft and being changeable in length through a control cable 27 leading to the control cockpit of the aircraft. The control airfoil 12 is provided with a horn 28 which is connected to the control system by conventional means, not shown.

As the control airfoil 12 is moved about its hinge axis 11, the pivot for rock arm 18 moves therewith but, since said pivot and pivot 25 are disposed on opposite sides of the hinge axis 11, the rock arm itself will be angled with respect to the control airfoil 12 and with respect to the fixed member 10 of the aircraft. The actual angular movement of the rock arm 18 will be less than that of the airfoil 12. Since the rock arm is controllably connected to the trim tab 23, the latter will move both with and with respect to the airfoil 12 and, depending upon the spacing between the rock arm pivot, the axis 11, and the pivot 25, will have an angular movement intermediate the neutral plane and the plane of the control airfoil 12. This is readily seen in Fig. 1 wherein, when the airfoil 12 is raised, the tab 23 is raised therewith but its angular movement is less than that of the airfoil but still it makes a definite angle with respect to the neutral plane. By adjusting the positions of the above mentioned pivots, a desired degree of differential movement may be secured to allow the trim tab to act as a servo control for the control airfoil 12 without adversely affecting the control forces which the airfoil 12 produces upon the aircraft when it is displaced.

To afford a trimming control in the neutral position, the strut length 26 may be varied through the cable 27 by which the trim tab 23 is moved with respect to the airfoil 12; the angular displacement afforded by this trimming will remain in effect when the control airfoil 12 is displaced from its neutral position.

In Fig. 4 the control elements 19' and 20' have been crossed so that movement of the tab 23 in an angular sense is greater than movement of the control airfoil 12 when the latter is controllably moved by the pilot. In this arrangement, the trim tab 23 will serve for trimming as previously described, but will augment rather than diminish the control forces afforded by the control airfoil 12. In the arrangement of Fig. 4, the tab 23 does not act as a servo tab but, since its angular displacement will be greater than that of the control airfoil, somewhat greater effort will be needed to move the control airfoil than would be the case if the trim tab were fixed in its angular relationship with respect to the control airfoil.

The arrangement herein disclosed affords a means for varying the effectiveness of the air control in an aircraft without major changes in the design, as well as affording a means for servo control of ailerons, rudders, and elevators.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In aircraft comprising a control airfoil hinged near its leading edge to the aircraft for controlled movement, a tab hinged substantially at the airfoil trailing edge, a bellcrank hinged in the airfoil at a point rearward of the airfoil hinge, means connecting one arm of the bellcrank with the tab, the other arm of the bellcrank extending forwardly of the airfoil hinge, and pivot means to adjustably fix the forward end of said other arm with respect to the aircraft.

2. In aircraft comprising a control airfoil hinged near its leading edge to the aircraft for controlled movement, a tab hinged substantially at the airfoil trailing edge, a support rigid with the aircraft, an arm adjustably and pivotally secured at its forward end, forward of the airfoil hinge, to said support, said arm extending rearwardly past the airfoil hinge, a pivot mounting for the rear end of said arm on the airfoil at a location rearwardly of the airfoil hinge, and means for connecting the tab to the arm for transmitting arm movements to the tab.

HARRY P. FOCHT.